United States Patent [19]

Ehrenfried et al.

[11] Patent Number: 4,816,799
[45] Date of Patent: Mar. 28, 1989

[54] RESISTIVE MATERIAL LEVEL SENSOR

[75] Inventors: Albert D. Ehrenfried, Maynard, Mass.; Michael D. Dabrowski, North Grosvenordale, Conn.

[73] Assignee: Metritape, Inc., Littleton, Mass.

[21] Appl. No.: 30,445

[22] Filed: Mar. 25, 1987

[51] Int. Cl.⁴ ............................................... H01C 7/00
[52] U.S. Cl. ........................................ 338/13; 30/90.4; 81/9.4
[58] Field of Search ...................... 338/305, 304; 7/470; 30/90.1, 90.4, 90.6, 9.7, 507, 92.5, 280, 289, 286, 314, DIG. 3; 81/9.4

[56] References Cited

U.S. PATENT DOCUMENTS

| 1,129,310 | 2/1915 | Platt | 81/9.4 X |
| 2,704,000 | 3/1955 | Miller | 81/9.4 X |
| 3,511,090 | 5/1970 | Ehrenfried et al. | 73/301 |
| 3,583,221 | 6/1971 | Ehrenfried | 73/301 |
| 3,792,407 | 2/1974 | Ehrenfried et al. | 338/13 |
| 4,313,049 | 1/1982 | Meywald et al. | 338/305 X |
| 4,536,957 | 8/1985 | Britton | 30/90.4 |

Primary Examiner—E. A. Goldberg
Assistant Examiner—M. M. Lateef
Attorney, Agent, or Firm—Weingarten, Schurgin, Gagnebin & Hayes

[57] ABSTRACT

A distributed resistance material level sensor which is sensitive to actuation pressure of the material in which the sensor is immersed, and ruggedized to provide protection of the sensor by forces encountered during handling and during use. The sensor includes an elongated strip having sensitive front and back surfaces and respective insensitive edges extending along the length of the sensor. An elongated protective element is provided on each edge of the sensor, the element being retained on a respective insensitive edge and having a cross-sectional extent to provide mechanical contact and abrasion protection.

12 Claims, 3 Drawing Sheets

RESISTIVE MATERIAL LEVEL SENSOR

FIELD OF THE INVENTION

This invention relates to material level sensors, and more specifically to resistive fluent material level sensors.

BACKGROUND OF THE INVENTION

This invention relates to a unique sensing device which is known commercially and described in the literature under the trademark "Metritape" sensor, and which is the subject of several U.S. patents, including U.S. Pat. Nos. 3,511,090; 3,583,221; and 3,792,407.

The Metritape sensor comprises an elongated metallic base strip having electrical insulation on the edges and back of the strip to define an uninsulated channel along the length of the base strip, and a resistance wire or ribbon helically wound around the insulated base strip, with the helical turns bridging the insulated edge portions being spaced from the underlying uninsulated channel of the base strip. This sensor structure is enclosed within a continuous polymeric or other protective sleeve to provide a clean and dry inner chamber for the sensor. The sensor is disposed within a tank or vessel containing the liquid or fluent material, the level of which is to be monitored. The pressure of the material surrounding the immersed sensor causes the deflection of the helical turns in the immersed portion of the sensor into engagement and electrical contact with the underlying base strip, such that an electrical resistance proportional to material level is provided.

Applications for this elongated resistive sensor have ranged from the gauging of deep oil and ballast tanks on ocean-going supertankers, to land-based tanks in which turbulent and agitated slurries are held, to more quiescent tankage in which petroleum and chemical products are stored. Within such application environments, the elongated sensor strip may be subjected to shock, vibration, sudden impacts, and scraping and tearing forces which result from contact of the sensor with surrounding structure. Furthermore, the pipe, channel, tank or sump in which the sensor is housed may have sharp edges, corners, threads, welds improperly made or inadequately ground, or other structural protrusions against which the sensor may strike or chafe.

It is, furthermore, desirable that the outer sheath of the elongated resistive sensor be impervious and resistant to chemicals, solvents, slurries and suspensions in which it is immersed. It is also required that the sensor outer envelope be compliant and responsive to external material pressures so that the air/liquid interface between the material and the void space above the material can be precisely and repeatedly located by the sensor.

To achieve this combination of requirements, which include sensitivity, ruggedness and resistance to corrosion, a polymeric material such as Teflon fluorocarbon, or an olefin such as polyethylene or polypropylene, may be employed as the outer jacket envelope. Such polymers, while having excellent chemical properties, are susceptible to wear, particularly when they are brought into abrasive contact with an angular steel structure. Under severe conditions of use, it may be necessary, assuming inadequate protection is provided, to replace the sensing device at periodic intervals, thus raising the cost for such installation in terms of both replacement parts and the labor required to perform the replacement.

Conditions of usage can be particularly severe when these sensing devices are used on board ocean-going vessels which may encounter severe wave and mechanical-motion conditions in open sea. Because such conditions may occur when the tanks are empty of product, there will then be no material present to provide viscous damping and cushioning of the sensor from the interior of a close-fitting steel pipe in which it may be contained.

Several techniques have been employed to provide protection for elongated resistive sensors during their years of varying usage. The sensors have been mounted in close-fitting, elastomeric tubes, or hoses, which have soft, non-metallic interior walls, this being a structure which may be employed when elongated resistive sensors are suspended down deep observation wells.

A more common protective means has been C-shaped channel, extruded in a configuration that captures the edges and the back of the sensor, but leaves the front face open for direct access and compression by surrounding fluent material. The resulting channel or bumper strip, provides protection to the sensor edges and back, but is difficult to clean and is expensive to extrude in the most corrosion resistant of polymer materials, such as Teflon fluorocarbon polymer.

The subject invention represents a means for achieving sensor edge protection by using highly qualified materials in forms that are readily available from commercial sources, making it unnecessary to develop specialized extruding and shaping dies, and other such costly tooling, made exclusively for this particular application.

Accordingly, it is an object of this invention to create a material level-sensing device which is highly responsive to the actuation pressures it must receive, and yet is protected against adverse damaging contact and abrasion.

Another object is to achieve such properties, using protective means that are readily available in forms that require only simple modification for their use.

A further object is to employ means that are available in a wide range of advantageous materials, in a selection of sizes and configurations, and in long unspliced lengths, resulting in application suitability and in minimum material waste.

Another object is to achieve a means for protecting the edges of a precision elongated sensor structure, having such shape as to cause the sensitive faces of the structure to stand away from potentially damaging surface and edges and thereby to reduce the potential for wear and damage.

Yet another object is to have protective means available in standardized form and in such dimensions that, when added to the underlying product, the overall dimensions are within the size of available access openings, allowing the enhanced structure to be used in both existing and future installations.

An additional object is to acquire edge protection materials having both shape and Physical properties that make them easy to modify for their application and which, when applied to the underlying product, do not distort it, damage it or otherwise interfere with its full and proper functioning.

Yet another object is to provide edge-protective means in such form and flexibility that it can be progressively attached to the underlying structure by simple hand tool, both in the factory and in the field, and at a pace that makes this enhancement economically attractive.

Another objective herein is to apply edge protection to an elongated material-level transducer such that the combined and assembled structure can be easily coiled for storage, packing and shipment, and such that coiling causes minimal relative motion and wear between the protective elements and the underlying sensor itself.

Another objective of this invention is to provide a protective means which has minimal interior volume for entrapment and retention of materials, for use in food and other applications where the retention and carryover of gauged material must be minimal.

Yet another object of this invention is to achieve a friction engagement force between the add-on reinforcement and the outer envelope of the transducer itself that is sufficient to retain the protective elements in place throughout usage, but which still allow easy removal, and even reuse, of the protective elements when such is desirable.

SUMMARY OF THE INVENTION

In brief, the present invention utilizes elongated shapes, such as a polymeric or elastomeric extrusion, requiring simple processing and a convenient means of application in order to impart mechanical and physical protection to a sensitive elongated transducer strip. The resulting enhanced product can be installed in existing installation sites and, because of the added protection afforded, can be used in a wider range of applications then heretofore possible. The protective element is in one embodiment in the form of a small-bore tube having stable and rigid cross-section, but being easily coiled with the underlying transducer for purposes of storage and handling, when applied in the manner described. The resulting combined structure has been found to have advantageous performance properties when used in the field, and to be cost-economic, even when enhancement is derived from high performance fluorocarbon materials. The protective element need not be coilable, but for some applications can be rigid.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
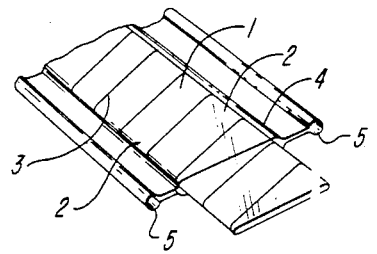
FIG. 1 is a cutaway pictorial view of a portion of an elongated resistive sensor within a polymeric sheath of the type with which the invention is employed.

The elongated resistive material level sensor with which the invention is employed is sold commercially and is known as a "Metritape" sensor, shown in FIG. 1. Referring to FIG. 1, there is shown an inner sensing element 1 having electrical insulation 2 on the edges and back, this serving to space a helical resistance winding 3 away from the conducting metallic base strip of inner sensor 1. A continuous polymeric sheath or boot 4, commonly of thin Teflon fluorocarbon film, is extruded to provide a clean and dry inner chamber for the sensing element, and in the illustrated embodiment has protective beads 5 on both outer edges. The polymeric boot 4 has outboard flanges 4a that provide edge protection, but this is limited because thickness of the polymeric sheath must be kept thin (nominally 0.010 inch, each face) for the element to be appropriately sensitive to actuation pressure of surrounding material, usually liquid or slurry. As formed, the sheath 4 provides little or no protection to the top and bottom sensor faces, and it is these surfaces that are commonly abraided or penetrated by a rough steel edge, a burr, scale buildup, or projecting slag of a poorly welded pipe joint through which the sensor passes.

Figure 2:
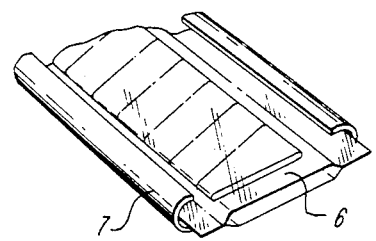
FIG. 2 is a cutaway pictorial view of a prior art technique that has been used to mechanically protect the polymeric outer sheath of the sensor of FIG. 1.

To protect the vulnerable polymeric sheath, which must maintain absolute tightness below the liquid surface, elongated resistive sensors are sometimes contained within flexible plastic tubes, or housed within stilling pipes which are themselves made of a plastic material that is less damaging to the thin sensor sheath. A construction long used is shown in FIG. 2. Here the inner sensor element 1 is shown contained within a polymeric sheath or boot 6, the side-flanges of which are captured by a semi-rigid plastic element 7, such as chlorinated vinyl (CPVC), to provide mechanical protection on the side edges and back surface. The polymeric boot 6 and the plastic channel 7 are sized to pass through a standard 1½" pipe nipple having a nominal internal diameter of 1.6".

The protective channel of FIG. 2 has been widely used, but only in materials to which chlorinated vinyl is chemically resistant, or at temperatures below 70° C. (150° F.), the upper operating limit of the channel material. Such a protective channel 7 has not yet been extruded in a superior thermoplastic material, such as FEP Teflon, because of economic restraints. The cost of the more chemically and temperature resistant material, and of the more demanding extrusion process, would result in prohibitive expense for a majority of the gauging applications.

The channel structure of FIG. 2 also entraps materials at the back of the sensor, between the boot 6 and the inside of the surrounding reinforcement channel 7. This may cause materials held in a tank earlier to be carried over to the next product being stored, causing contamination of same, and sometimes producing dangerous intermixing of chemicals. The protective channel, as shown, would thus not be suitable for use in many chemical applications, or in food and dairy products where cleanliness is Paramount and the breeding of bacteria must be prevented.

Figure 3:
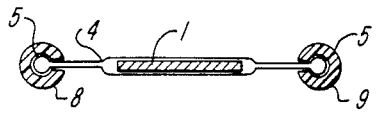
FIG. 3 is a cross-sectional view of the elongated sensor embodying the invention to provide the prescribed sensor edge protection.

A structure in accordance with the invention that entraps less material and is more open to flushing action is shown in an embodiment of the invention in FIG. 3. Here, in cross-sectional view, the elongated resistive sensor 1 is enclosed within the sheath 4, with the side flanges 4a terminated with small beads 5 on both edges. Two protective elements in the form of small-bore tubes 8 and 9, such as extruded of polymer or elastomer, are shown attached to the described sensor structure. Each tube 8 and 9 is slit radially through one side, and the tube applied so as to capture the small bead 5 within its internal diameter, thus securing the tubing as a protective side-rail. The tubing 8 and 9 can be of any suitable wall thickness. In practice both edge-protective tubings are preferably identical so that the sensing element between them would not be distorted by any differential forces, particularly during coiling and uncoiling of long lengths of the structure during storage and transportation. The tubular elements 8 and 9 preferably have an inner diameter or configuration approximately the same as the outer diameter or configuration of the beads 5 to minimize the space therebetween in which debris can collect.

The small-bore tubings 8 and 9 can be of standard tube stock which is commercially available in the local stocks of industrial distributors, and in a wide range of materials, sizes, wall thicknesses, finishes, colors and rigidities. Such tubing is commonly used to transport liquids and to transmit pneumatic or hydraulic pressure and, by its widespread usage for gas and liquid transport, is readily available at relatively low cost. For the invention, superior chemical properties, and usage at both higher and lower temperatures, is permitted at much lower material cost by use of commercially available tubing, than could be obtained through use of custom extrusions which would be prepared only for this singular use. Custom extrusions are contemplated by the invention for enhanced performance and are shown in exemplary embodiments below.

It can be seen from FIG. 3 that the protective elements 8 and 9 extend outward from the front and back faces of Teflon sheath 4 and thus tend to fend these vulnerable surfaces away from metallic edges, and particular from the internal diameters of pipes, where the structure advantageously forms a chord against the curved internal surface, further holding the thin-wall sheath away from potential puncture or abrasion.

It can also be seen from FIG. 3 that there can be very little entrapment of material by the protective elements, as the tubing provides minimal internal space into which residue might accumulate. The structure of the invention represents a significant advance over the past practice illustrated in FIG. 2. If the elements 8 and 9 are of fluorocarbon material, such as FEP or TFE Teflon, the operating temperature range of the resultant structure is greater than previously shown, allowing the use of hot water, or even mild steam for cleaning and sterilizing the elongated sensor, as may be required for certain critical applications.

Figure 4:
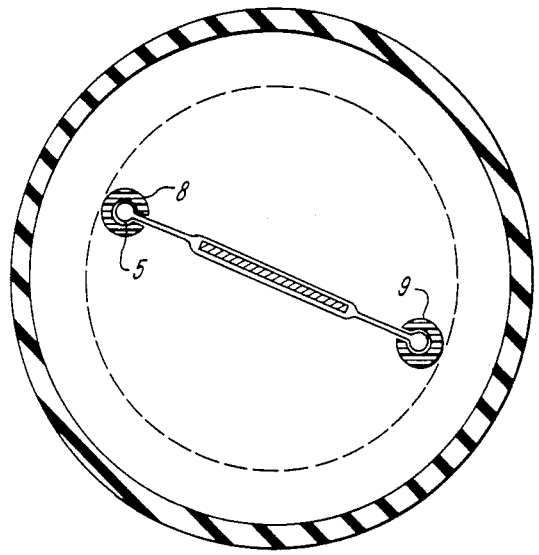
FIG. 4 is a cross-sectional top view, showing the sensor and protective elements within a typical installation in a stilling pipe.

Referring to FIG. 4, the sensor is shown in a typical installation in a stilling pipe 10. The dotted circle 11 represents a pipe nipple through which the elongated sensor is commonly installed. The inner dimension of this pipe nipple imposes a restraint on the width of sensors that can be easily lowered into place. The pipe 10 is representative of the size of the stilling pipe that is commonly used as a site for the elongated resistive sensor. This larger size is desirable to prevent wax or other contaminants from building up within the stilling pipe interior and thereby impeding rapid and accurate actuation of the resistive level sensor. The larger diameter also means, however, that the suspended sensor is free to move about, and abraid against, the pipe internal diameter, and such action is particularly prevalent when these sensors are used on ships at sea, and often with no liquids present in the tank to provide a desirable viscous damping effect. The side guards of the invention prevent or substantially minimize the opportunities for such damage.

Figure 5B:
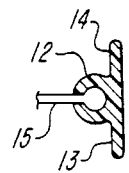
FIG. 5B is a sectional view of another alternative protective element configuration.
Figure 5A:
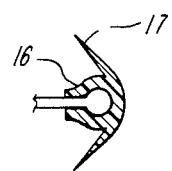
FIG. 5A is a sectional view of an alternative protective element configuration.
Figure 5C:
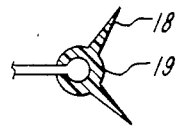
FIG. 5C is a sectional view of yet another alternative protective element configuration.

The protective elements can be formed in a variety of shapes in addition to the tubular shape described above. As shown in FIG. 5A, the element 12 has oppositely extending vanes 13 and 14. This shape can be readily extruded from a suitable plastic material to suit the particular operating requirements. This shape can be sized to fit easily within the pipe nipple 11, and provides extensions 13 and 14 that further guard the front and back surfaces of the thin-wall sensor boot. The slit 15 in the tubular portion can be extruded in place, or can be formed by slitting as described. An alternative shape is shown in FIG. 5B wherein the extrusion has lip portions 16 which extend inward to provide a more extended engagement with the sensor boot. This version also includes inwardly extending thin vanes 17 which are flexible to deflect during coiling of the sensor and attached protective elements. Another shape is shown in FIG. 5C wherein thin flexible vanes 18 extend outward from tubular portion 19, and which are sufficiently flexible to deform during insertion through the pipe nipple and then spring outward to the shape illustrated to provide added protection against contact with the inner surface of the stilling pipe in which the sensor is installed. These flexible vanes can also flex during coiling of the sensor.

The shapes shown are for purposes of illustration only; there can be other configurations that fall within the scope of this invention to provide the intended protection of the sensor. The protective elements, for those versions which are coilable, should have a coiling axis which is substantially the same as that of the sensor to permit coiling and uncoiling without damage or strain to the sensor or its components.

The protective elements need not be coilable, but may be of rigid or substantially rigid construction, such as for shorter lengths of sensor. The rigid elements can be made of stiff plastic, metal or other materials having the requisite characteristics for sensor protection. The rigid elements typically can include the attachment groove for acceptance of the sensor.

An important aspect of the subject invention is the formation of an attachment seam or slit, such that the protective element will engage the polymeric boot firmly, but without damage, and which is straight and radial so as not to distort the critical edges of the sensor boot, nor cause cusps or undulations therein.

Figure 6:
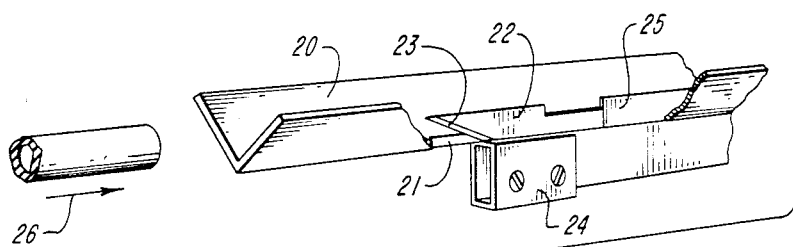
FIG. 6 is a pictorial view of a fixture for the precise radial slitting of the tubing portion of the protective element in a straight line along the tubing longitudinal axis.

An embodiment of a slitting tool for the formation of such seam is shown in FIG. 6. Here a 90° V-channel 20 of rigid metal, such as steel or aluminum, is machined to form a thin slot 21 at the channel root 27. A clamp 24 with threaded fasteners, holds a replaceable knife blade 22, such that the cutting edge 23 of the blade faces downward toward the channel root 27 and forms an acute angle therewith. Also at the channel root, and in the same plane of the knife blade 22 is a thin metallic vane 25 that extends for a distance of several inches along the root of the channel.

In operation, tubing or other shape to be slit is introduced at the left in the direction of arrow 26. The sharp point of the blade enters the tubing internal diameter, and its cutting edge 23 first engages the tubing wall, by its raked angle, driving the tubing toward the channel root 27, which serves as an anvil against which a clean cutting action is performed. The slit tubing then advances to engage the vane 25 within the slot just cut, and the tubing is thereby held in a straight orientation as it proceeds in the direction of arrow 26. To further insure such straight cutting action the tubing, before it enters the cutting station, should be relaxed and made free of kinks and twists, paying directly and straightly from a reel, preferably of large diameter, on which the stock was originally coiled at the time of extrusion. Since it is adjustably positioned, the cutting blade 22 can be moved and angled to present a fresh cutting edge at the point of tubing engagement, and can be changed easily to a fresh blade when required.

Figure 7:
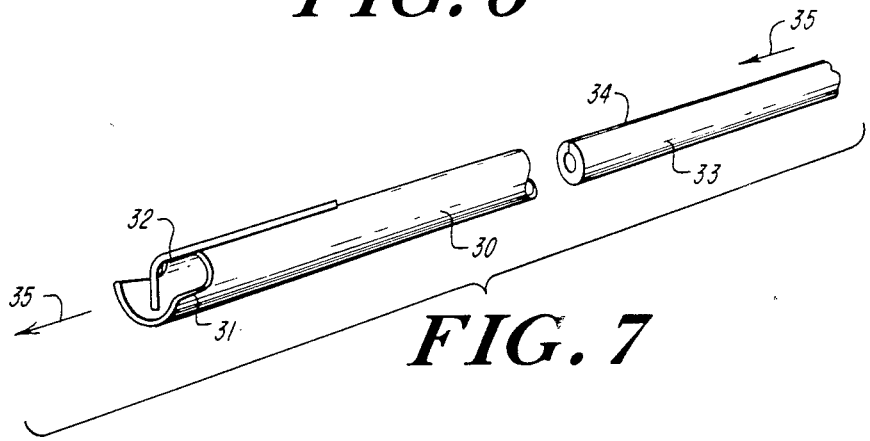
FIG. 7 is a pictorial view of a hand-operated tool for continuous application of a slit, tubular shaped protective element to an edge of the extruded polymeric sheath.

To install the slit tubing, or other such side-rail shape, to the delicate edges of the sensor, a hand tool such as shown in FIG. 7 may be employed. Here, a plastic tubing 33 having a slit 34 oriented to the top, enters the tubular handle 30 in the direction 35. The tubing emerges into the cutout opening 31 and engages the separating finger 32. This finger may be wedge shaped to cause easy initial opening of slit 34, and is given sufficient width to open the slit adequately to pass over the bead 5 or other edge of the sensor boot. It has been found, by use of such tool, that protective elements can be flowed onto sensor edges in a smooth and continuous manner without damage to the sensor edges.

Figure 8:
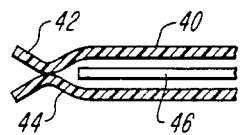
FIG. 8 is a cutaway sectional view of an alternative edge configuration of the polymeric sheath.
Figure 9:
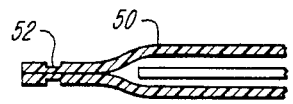
FIG. 9 is a cutaway sectional view of another alternative polymeric sheath edge configuration.

The sensor edges to which the protective elements are attached can be other than of the beaded configuration shown and described above. An alternative sensor edge construction is shown in FIG. 8 wherein the sheath 40 is formed of two strips of Teflon or other film material, each having a flared end 42 and heat sealed at position 44 to provide an enclosed inner space for the sensor strip 46. The flared edge portions 42 provide an enlarged side edge for retention of the protective element, in similar manner to the bead, as in the above embodiment. A further edge configuration for the sensor sheath is shown in FIG. 9 wherein the sheath 50 is again formed by two strips of Teflon or other film material heat sealed along the side edges, the side edges being embossed to form opposing grooves 52. The embossing can be accomplished by the heat sealing tool and can be separately provided by appropriate tooling. The embossed grooves 52 are sized and configured to accommodate and retain respective edges of the slit tubular portion of the protective element, thereby to retain the element on the side edge of the sensor.

The structure shown and described in this specification is illustrative of the forms which the subject invention may take. Other configurations incorporating similar principles and practices are deemed to fall within the spirit of this invention. Moreover, the invention is equally applicable to Metritape and other strip type sensors used for other than level sensing, such as for temperature sensing. Accordingly, the invention is not to be limited except as indicated in the appended claims.

What is claimed is:

1. For use with an elongated tape-like sensor having front and back surfaces subject to damage, and first and second insensitive edges extending along the length of the sensor, protective means comprising:
   first and second discrete elongated protective elements each operative to engage and be retained on a respective insensitive edge of the sensor along at least a portion of its length;
   each of said elongated protective elements having a cross-section of dimensions that, when said elongated protective elements engage and are retained on the respective insensitive edges of the sensor, extend outward beyond the front and back surfaces of the sensor to provide protection against damage to the surfaces.

2. The invention of claim 1 wherein each protective element includes a portion operative to grip means disposed along the respective insensitive edge of the sensor cooperative with said protective element for protecting the sensor.

3. The invention of claim 2 wherein
   each protective element has an internal cavity along its length configured to accommodate a respective bead disposed along the respective insensitive edge of the sensor, and a radial slit along the length of said protective element by which said protective element can be installed on the bead along the edge of the sensor.

4. The invention of claim 2 wherein
   each protective element has an internal cavity along its length configured to accommodate respective oppositely facing grooves extending along the respective edge of the sensor, and a radial slit along the length of said protective element by which protective element can be installed on the grooves along the edge of the sensor.

5. The invention of claim 2 wherein
   each protective element has an internal cavity along its length configured to accommodate a respective flared portion disposed along the respective insensitive edge of the sensor and a radial slit along the length of said protective element by which protective element can be installed on the flared portion along the edge of the sensor.

6. The invention of claim 2 wherein each of the protective elements is a small bore tube having a radial slit through the tubing wall.

7. The invention of claim 2 wherein each of the protective elements includes an extruded plastic member having a tubular portion extending along the length thereof, a radial slit through the wall of the tubular portion, and outwardly extending vanes integral with the tubular portion and extending outward from the respective sensor edge.

8. The invention of claim 2 wherein each of the protective elements includes an extruded plastic member having a tubular portion, a radial slit through the wall of the tubular portion, and oppositely extending vanes which join the tubular portion at a portion opposite to the portion having the slit, the vanes extending outwardly from the tubular portion.

9. The invention of claim 8 wherein the vanes are sufficiently flexible to deform during coiling or installation of the sensor.

10. The invention of claim 6 wherein the tube has portions adjacent the slit which extend laterally inward of the sensor.

11. For use in applying a tubular slitted protective element to the insensitive edges of an elongated sensing strip, tooling means comprising:

a tubular element operative to receive the protective element, and having an entrance end and an exit end;

a finger positioned at said exit end of the tubular element, and extending into the interior short of the internal tube diameter;

wherein said finger is capable of spreading open the slit in the protective element and holding the slit open to allow the slit to be engaged progressively with the insensitive edge of the sensing strip when the slitted protective element is entered into the tubular element and moved through the tubular element passed said finger.

12. For use in slitting the longitudinal cavity wall of a protective element for an elongated sensor, tooling means comprising:

a longitudinal V-channel having a root;

a replaceable cutting blade positioned in the channel and having a cutting edge facing the root of the V-channel and forming a shallow acute angle therewith;

a thin longitudinal vane positioned in the same plane as the cutting blade and extending above the root of the channel by approximately the same distance as the cutting blade;

such that a protective element advanced along the root of the V-channel engages the cutting blade and is urged by the angle of the cutting edge into the root of the V-channel and thereafter cleaved to form a radial slit in a wall of the protective element;

the longitudinal vane thereafter entering the formed radial slit, and serving to hold the protective element without twist or other departure from a straight course.

* * * * *